(12) United States Patent
Krashinsky et al.

(10) Patent No.: US 9,971,699 B2
(45) Date of Patent: May 15, 2018

(54) METHOD TO CONTROL CACHE REPLACEMENT FOR DECOUPLED DATA FETCH

(71) Applicant: NVIDIA Corporation, Santa Clara, CA (US)

(72) Inventors: Ronny Meir Krashinsky, San Francisco, CA (US); Xiaogang Qiu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 20 days.

(21) Appl. No.: 15/146,834

(22) Filed: May 4, 2016

(65) Prior Publication Data

US 2017/0322887 A1 Nov. 9, 2017

(51) Int. Cl.
*G06F 12/08* (2016.01)
*G06F 12/0891* (2016.01)
*G06F 12/0862* (2016.01)
*G06F 12/0897* (2016.01)
*G06F 9/30* (2018.01)
*G06F 9/38* (2018.01)

(52) U.S. Cl.
CPC ...... *G06F 12/0891* (2013.01); *G06F 9/30043* (2013.01); *G06F 9/3838* (2013.01); *G06F 12/0862* (2013.01); *G06F 12/0897* (2013.01); *G06F 2212/602* (2013.01)

(58) Field of Classification Search
CPC ............. G06F 12/0862; G06F 9/30043; G06F 2212/602; G06F 12/0891; G06F 9/3838; G06F 12/0897
USPC ........................................................ 711/125
See application file for complete search history.

(56) References Cited

U.S. PATENT DOCUMENTS

| | | | | |
|---|---|---|---|---|
| 2007/0113233 | A1* | 5/2007 | Collard | G06F 9/52 718/101 |
| 2009/0182992 | A1* | 7/2009 | Greiner | G06F 9/30043 712/225 |
| 2011/0072218 | A1* | 3/2011 | Manne | G06F 12/0862 711/136 |
| 2016/0070549 | A1* | 3/2016 | Hall | G06F 8/41 717/140 |

* cited by examiner

*Primary Examiner* — Jasmine Song
(74) *Attorney, Agent, or Firm* — Zilka-Kotab, PC

(57) ABSTRACT

A method, computer readable medium, and system are disclosed for decoupling data pre-fetch from demand loads. The method includes the steps of receiving, by a processor, a set of instructions that includes a load instruction; and executing, by the processor, the load instruction to perform a load operation. The load operation loads data from a cache unit into a register file. The load instruction includes a no-update operator that prevents the cache unit from updating the cache state information in response to the load operation. The result is that the eviction policy for the cache unit responds to the order of pre-fetch memory access requests rather than the demand load operations.

20 Claims, 10 Drawing Sheets

METHOD TO CONTROL CACHE REPLACEMENT FOR DECOUPLED DATA FETCH

FIELD OF THE INVENTION

The present invention relates to memory operations, and more particularly to eviction policies for a cache.

BACKGROUND

Many processor architectures implement a hierarchical memory architecture that includes on-chip, high-speed cache units for storing data located in off-chip memory in a temporary data store that is quickly accessed by processing units on-chip. For example, the processor may be coupled to a synchronous dynamic random access memory (SDRAM) chip from which data may be loaded into on-chip cache units. The cache units may be distributed in a hierarchical manner such that a level 2 (L2) cache is shared among a plurality of cores of the processor, and each core is also associated with a level 1 (L1) cache that corresponds with that core. A thread executing on a particular core may access memory in the SDRAM by transmitting a memory access request to the corresponding L1 cache for that core. The L1 cache checks the data currently stored in the cache to determine if there is a cache hit (i.e., the data associated with the address in the memory access request currently resides in the cache). If there is a cache hit, then the L1 cache unit returns the data to the core to be processed by the thread. However, if there is a cache miss (i.e., the data associated with the address in the memory access request is not currently in the cache), then the L1 cache may transmit the memory access request to the L2 cache to determine if the data is stored in a higher level of the cache hierarchy. The L2 cache may return the data if there is a cache hit or may transmit the memory access request to the external memory to retrieve the data if there is a cache miss. Different architectures may have different numbers of hierarchical levels of cache units (e.g., L1, L2, and L3).

Each cache is limited in size and may store a particular number of cache lines. For example, an L2 cache may be 2048 KB (kilobytes) while a L1 cache may be 64 KB, with each cache line being 512 B (bytes) or 1024 B in size. Thus, each cache may implement an eviction policy that determines when a particular cache line is evicted from the cache to make room for a new cache line. Example eviction policies are based on access order priority, most recently used (MRU), and least recently used (LRU). Other eviction policies are well-known in the art as well.

It can be difficult for a processor to fetch data at a high rate using regular load instructions. For example, a thread may issue a load instruction that causes a memory access request to be transmitted to the L1 cache. If that memory access request results in a cache miss, then the thread will stall and wait for the data to be fetched into the L1 cache. The thread may stall for hundreds or even thousands of cycles while waiting for the data to be loaded from the memory. In conventional systems, registers will be allocated when the load instruction is issued and, therefore, these registers may sit unused while the thread waits for the data to be fetched. In addition to the allocated registers, other execution resources associated with the stalled threads may also remain idle waiting for the data to be fetched. The inefficiency is compounded in multi-threaded processors where different threads may issue load instructions with addresses corresponding to the same cache line as the previously issued memory access request. With prefetching, a first prefetch load instruction may be used to fetch data from a memory into a cache unit and a second demand load instruction may be used to load the data from the cache unit into a register file. There may be multiple prefetch load memory access requests corresponding to the same cache line; for example, different threads in a multi-threaded processor may issue different prefetch load memory access requests, and these memory access requests may be coalesced by the L1 cache unit. Once the data is fetched into the L1 cache, both threads may separately load the data from the L1 cache into a register file in order to process the data. The load operations may be completed many cycles apart while each thread waits to be activated. Furthermore, each load instruction may increase or decrease the cache line's priority for replacement in association with the eviction policy. By coupling the eviction mechanism to the load instruction, it is possible that a particular cache line is evicted after one thread loads the data into the register file but before the other thread has loaded the data into the register file, necessitating the data be fetched into the L1 cache a second time and causing the second thread to stall even further. It is also possible that the cache line is prioritized to remain in the cache for longer than necessary after the demand load has completed, wasting valuable cache capacity while other cache lines are evicted. These types of inefficiencies should be avoided. Thus, there is a need for addressing these issues and/or other issues associated with the prior art.

SUMMARY

A method, computer readable medium, and system are disclosed for decoupling data pre-fetch from demand loads. The method includes the steps of receiving, by a processor, a set of instructions that includes a load instruction; and executing, by the processor, the load instruction to perform a load operation. The load operation loads data from a cache unit into a register file. The load instruction includes a no-update operator that prevents the cache unit from updating the cache state information in response to the load operation. The result is that the eviction policy for the cache unit responds to the order of pre-fetch memory access requests rather than the demand load operations.

DETAILED DESCRIPTION

As discussed above, threads of execution typically include load instructions that cause data to be loaded from an external memory into a register file where the threads can access the data. The processor executing a thread loads the data from the memory into a cache unit in large segments called cache lines and then data words (e.g., 64-bit values) from the cache lines are loaded into the registers in the register file. Since the cache units are finite resources that only hold a small percentage of the total data stored in the memory, various algorithms are employed in order to ensure efficient transfer of data from the memory into the cache units.

For structured memory access patterns where addresses are known in advance, it is more efficient to decouple data fetch from thread computation. One implementation of this technique it to utilize a "prefetch" operation such that the data for one or more threads is loaded into the cache prior to the data being used for a computation. Thus, once the threads are ready to process the data, the data should already be in the L1 cache unit, which will result in cache hits during the execution of load instructions. Thus, threads that use a prefetch operation will encounter significantly less latency due to memory access operations and spend less time stalled waiting for data. Furthermore, by bulk prefetching several cache lines that will eventually be operated on by the threads, the latency associated with cache misses will overlap. Bulk prefetching avoids serialized stalls that would occur due to cache misses if a thread utilized regular load instructions.

A decoupled, data fetch architecture would ideally keep the pre-fetched data in the cache unit just long enough for the load instruction to result in a cache hit. If the data is evicted from the cache unit too soon, then the load instruction will result in a cache miss, thereby wasting the benefits of decoupling the data fetch. However, fetching the data too soon may waste cache resources, causing other cache lines to be evicted prematurely. A common assumption would be that a load instruction should immediately evict a cache line after the data in the cache line has been loaded into the register file. However, multiple load instructions from one or more threads may access data from the same cache line such that this may be an inefficient solution to free up cache resources.

A better solution is to provide cache eviction control within the load instructions such that some load instructions mark a particular cache line for eviction while other load instructions do not. Thus, a compiler may choose to use specific instructions based on the type of cache eviction policy that performs best for a particular algorithm.

Figure 1A:
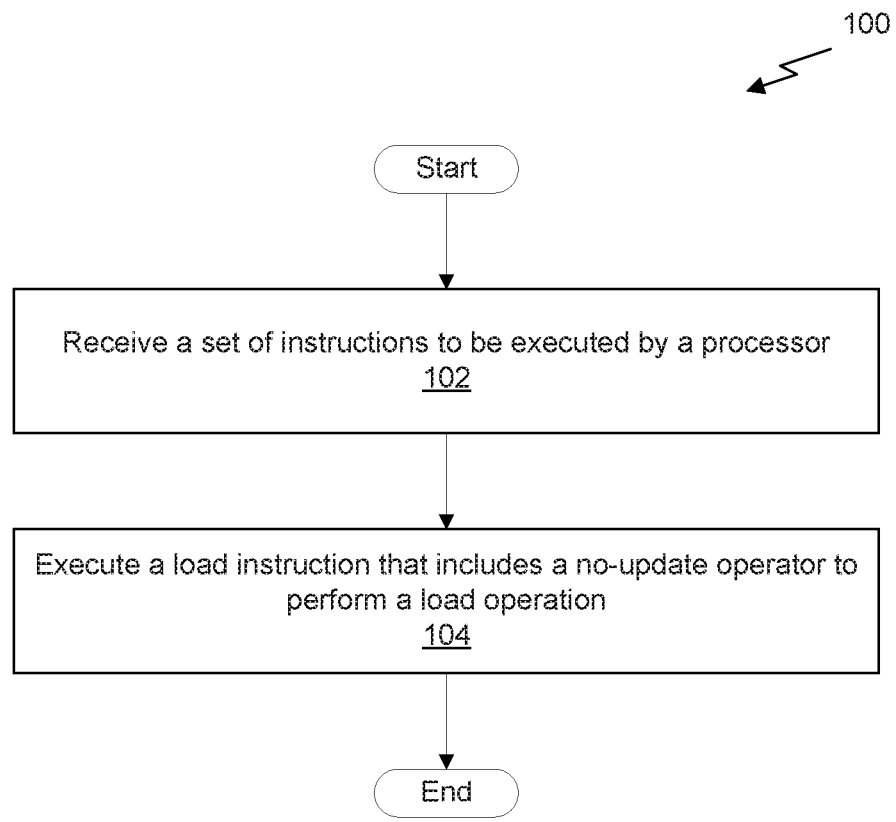
FIG. 1A illustrates a flowchart of a method for issuing load instructions that include control for cache replacement operations, in accordance with one embodiment.

FIG. 1A illustrates a flowchart of a method 100 for issuing load instructions that include control for cache replacement operations, in accordance with one embodiment. At step 102, a processor receives a set of instructions to be executed by the processor. In one embodiment, the processor is a parallel processing unit that includes a cache unit. The processor may also include a memory (e.g., RAM) to store cache state information associated with the cache unit. The cache state information may represent a priority order pertaining to the cache unit's eviction policy. In one embodiment, the memory may be included in the cache unit and memory access requests associated with load instructions may be configured to update the cache state information. The memory may include a number of entries, one entry per set of cache lines in the cache unit. Each entry may store a set of bits that identify a priority order for eviction of the cache lines in the corresponding set of cache lines.

The set of instructions may include at least one load instruction that comprises an opcode, an address operand, a destination register operand, and an optional cache operator. The cache operator may specify how a load operation associated with the load instruction is performed. For example, the load operation may cause the cache state information to be updated when the load operation is performed; the load operation may prevent the cache state information from being updated when the load operation is performed; the load operation may only load the requested data into an L2 cache unit but not an L1 cache unit; or the load operation may mark the associated cache line to be evicted immediately after the load operation is performed.

At step 104, the processor executes the load instruction to perform a load operation. The load operation may cause a memory access request to be issued to the cache unit. The cache operator of the load instruction may specify a no-update operator that prevents the cache unit from updating the cache state information for the cache line associated with the memory access request. By preventing the cache state information from being updated, the no-update operator prevents the load operation from changing the priority order of the cache line for the eviction policy. Consequently, the cache line will be evicted based on the priority order of the cache line prior to the load operation.

Figure 1B:
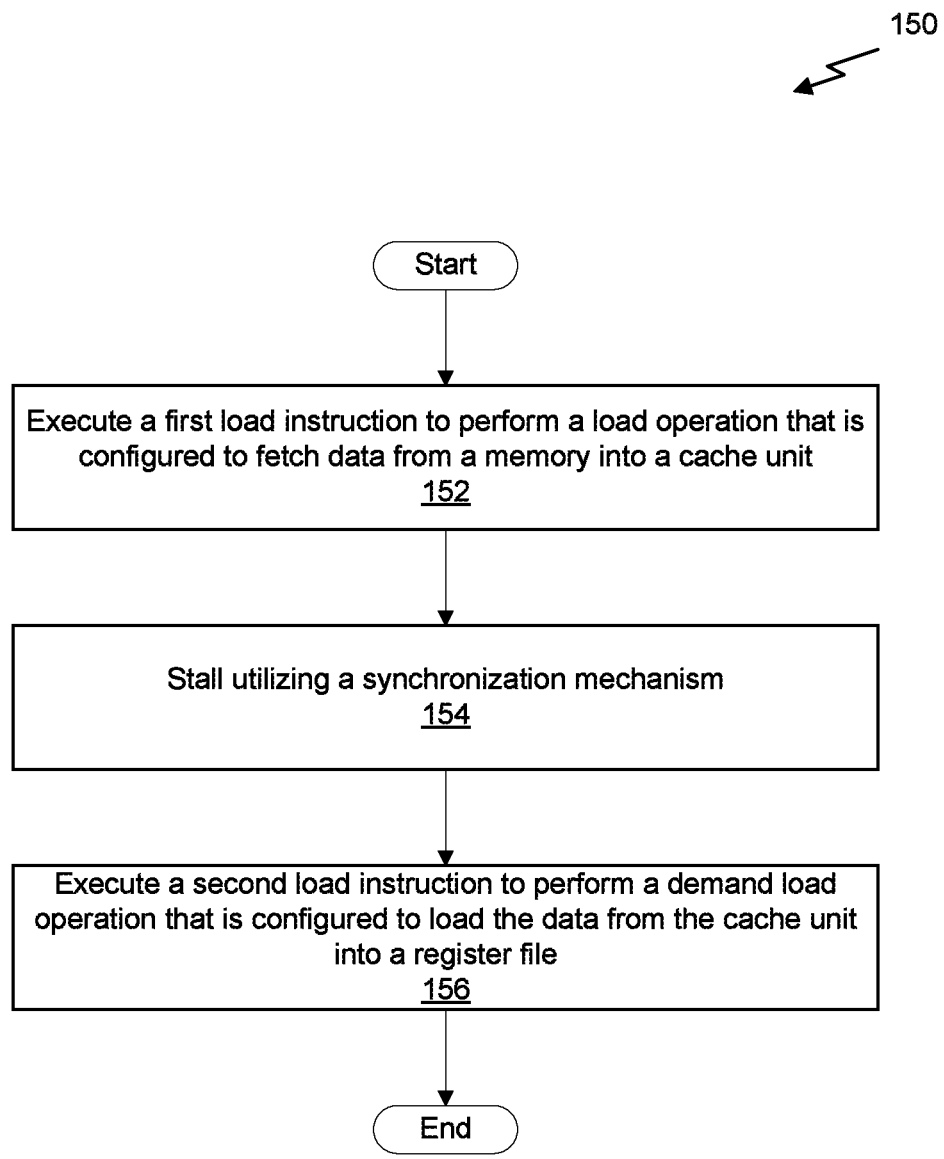
FIG. 1B illustrates a flowchart of a method for issuing load instructions that include control for cache replacement operations, in accordance with another embodiment.

FIG. 1B illustrates a flowchart of a method 150 for issuing load instructions that include control for cache replacement operations, in accordance with another embodiment. At step 152, a first load instruction is executed to perform a prefetch load operation. The load operation is configured to fetch data from a memory into a cache unit. The load operation causes cache state information corresponding to a cache line associated with the first load instruction to be updated. For example, if the eviction policy is least-recently-used (LRU), then the cache state information corresponding to a cache line associated with the first load instruction will be updated to reflect that cache line is the most-recently-used (MRU) in the set of associated cache lines. The data is not loaded into any registers but is simply fetched into the cache unit. In one embodiment, the first load instruction includes a destination register operand that specifies a value set to a null register (i.e., a load instruction targeting register RZ).

At step 154, a synchronization mechanism causes a thread to stall until the load operation associated with the first load instruction is completed. The synchronization mechanism may be a barrier instruction that causes the thread to wait until a condition has been met. For example, the condition might be an acknowledgement from a load/store unit that the first load instruction was successful and that the data is stored in the cache unit. The synchronization mechanism may be configured to stall the thread until multiple, previously issued load instructions have been completed successfully such that multiple cache lines are now stored in the cache unit. Once the condition has been met, the thread will be allowed to move past the barrier instruction.

At step 156, a second load instruction is executed to perform a demand load operation. The demand load operation is configured to load the data from the cache unit into a register file. The second load instruction corresponds to the first load instruction in that the data is included in a cache line fetched by the first load instruction. In contrast with the first load instruction, the second load instruction may be configured to not update the cache state information corresponding to the cache line. The second load instruction may be referred to herein as a "demand load" which loads data into the register file without changing the priority order for the corresponding cache line according to the cache unit's eviction policy. In other words, the priority order for the cache line corresponding to the demand load remains the same after the load operation as before the load operation. In conventional architectures, every load operation would result in an update of the cache state information which would change the priority order for the cache lines in the cache unit for both pre-fetch operations and demand load operations. However, updating the priority order during demand load operations is typically not the most efficient implementation of cache eviction policy.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
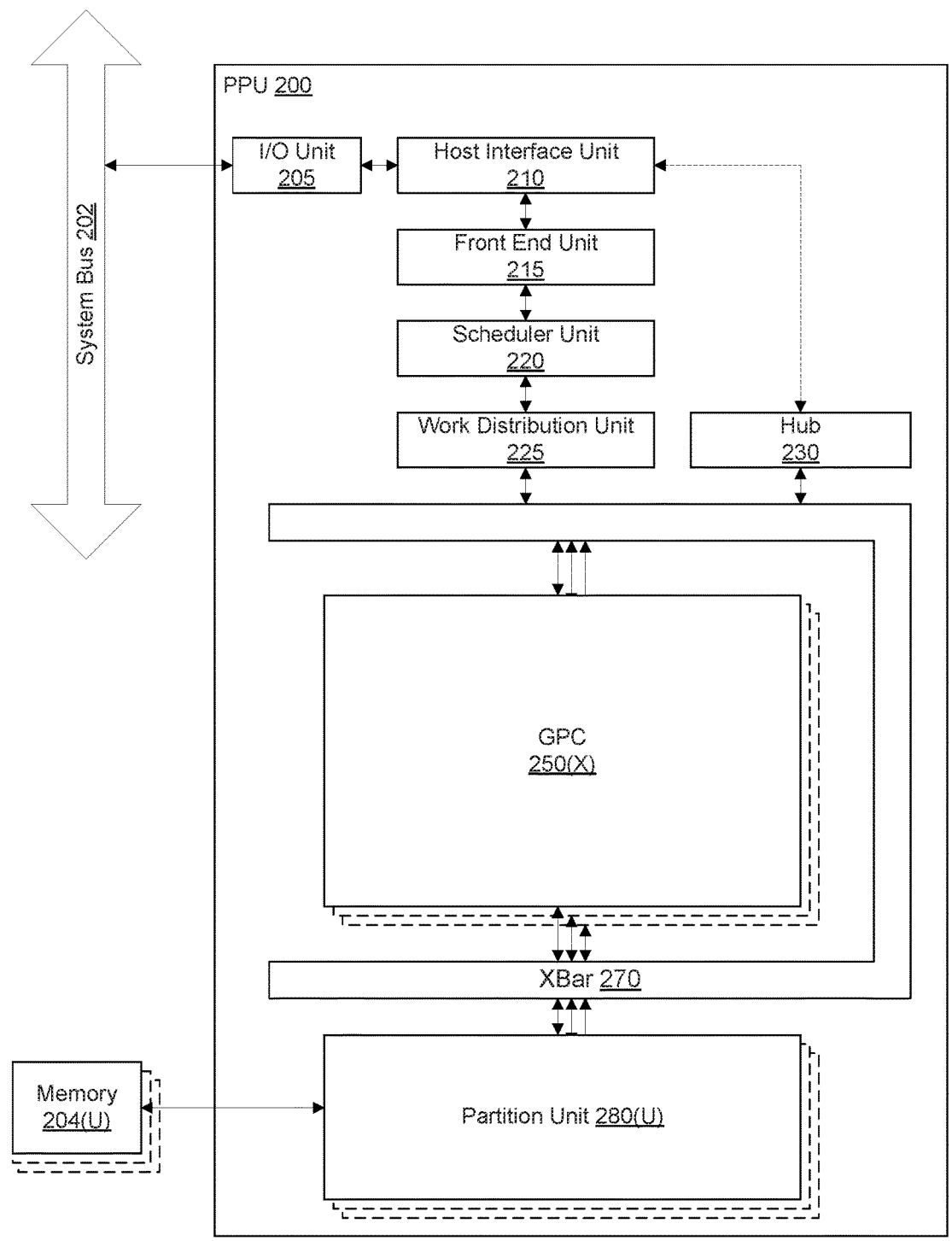
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
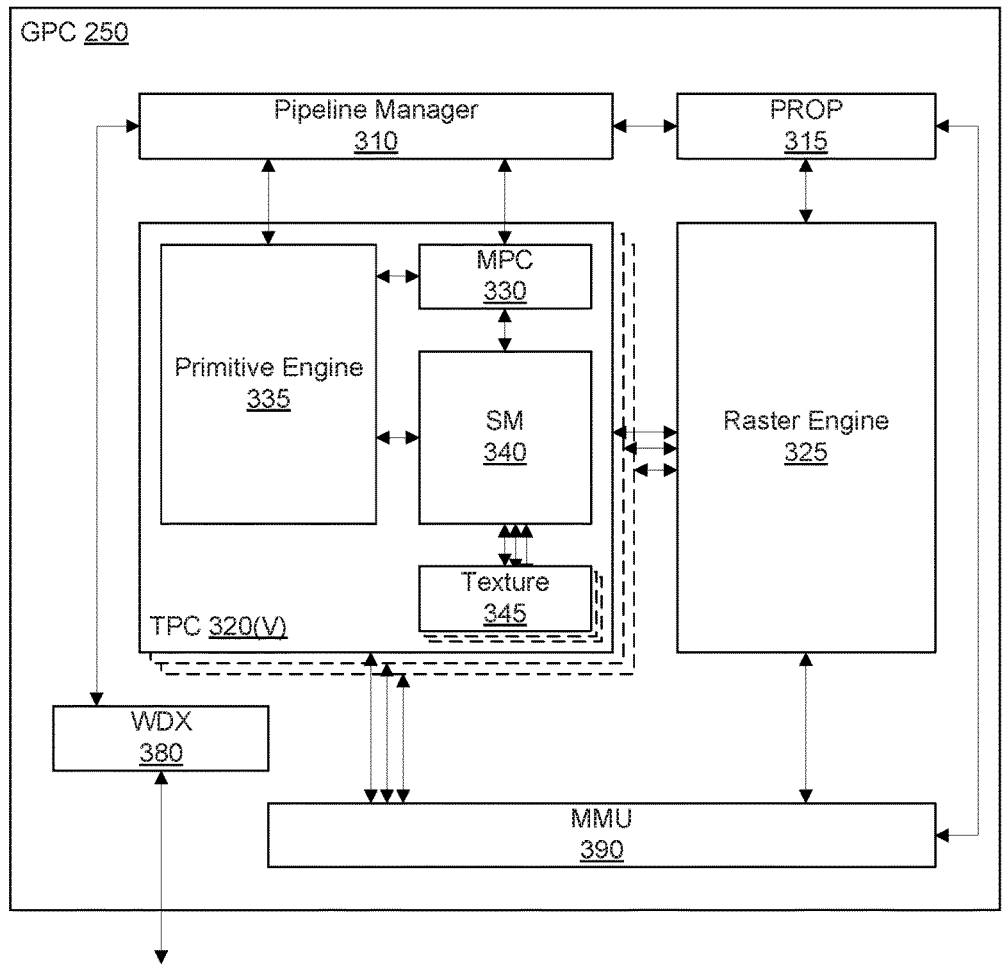
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
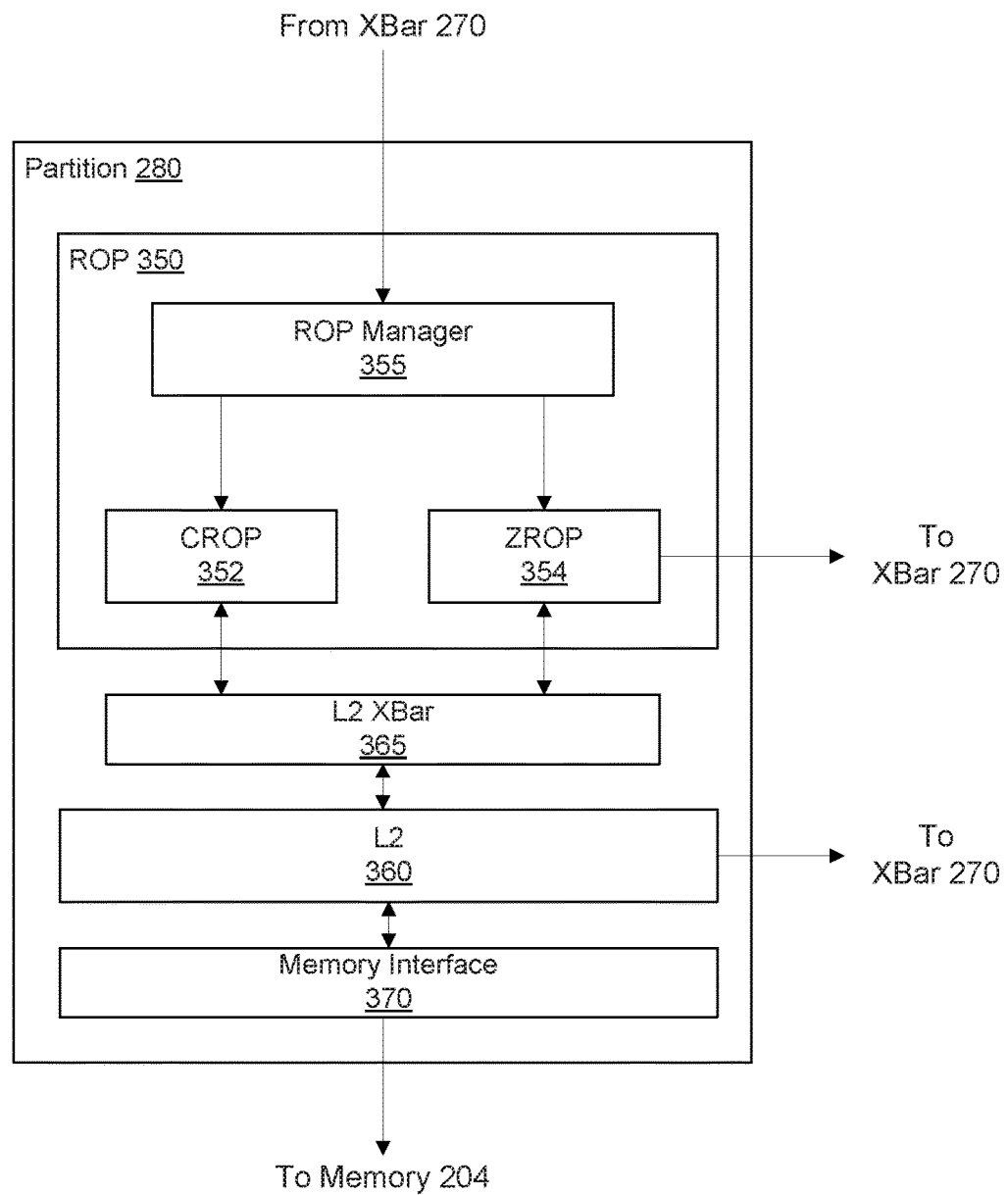
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
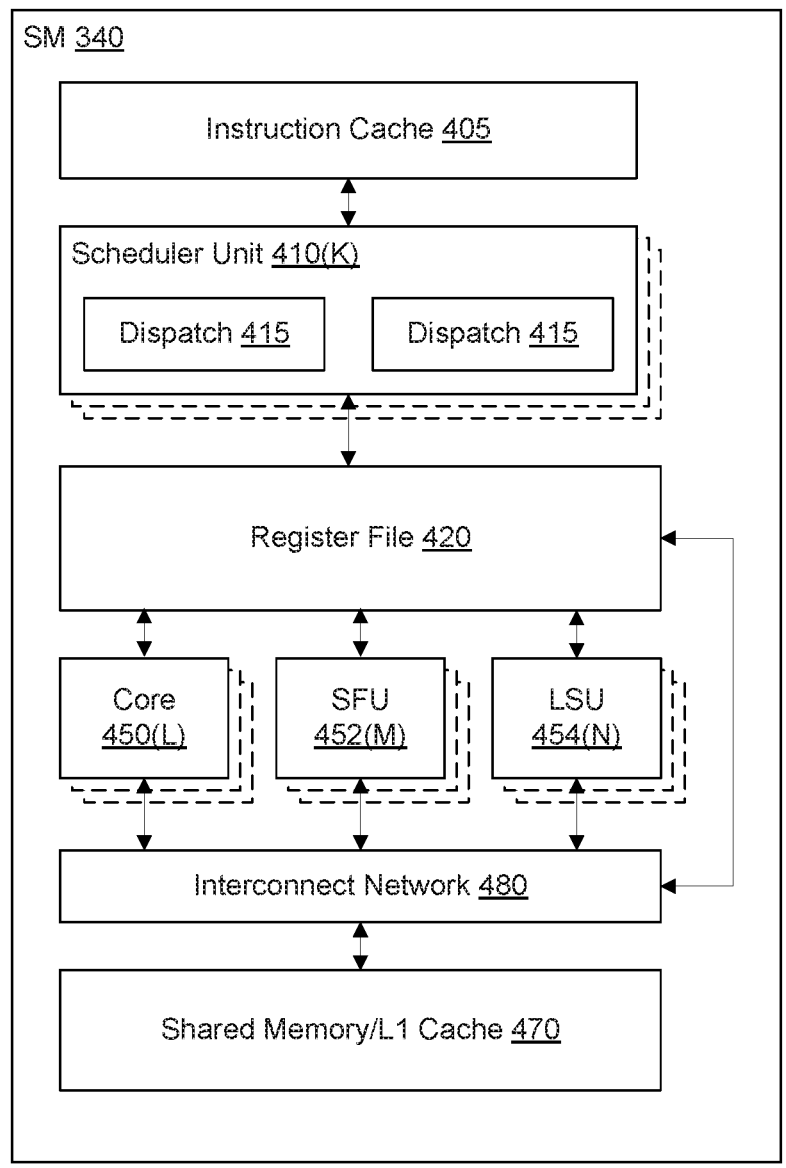
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
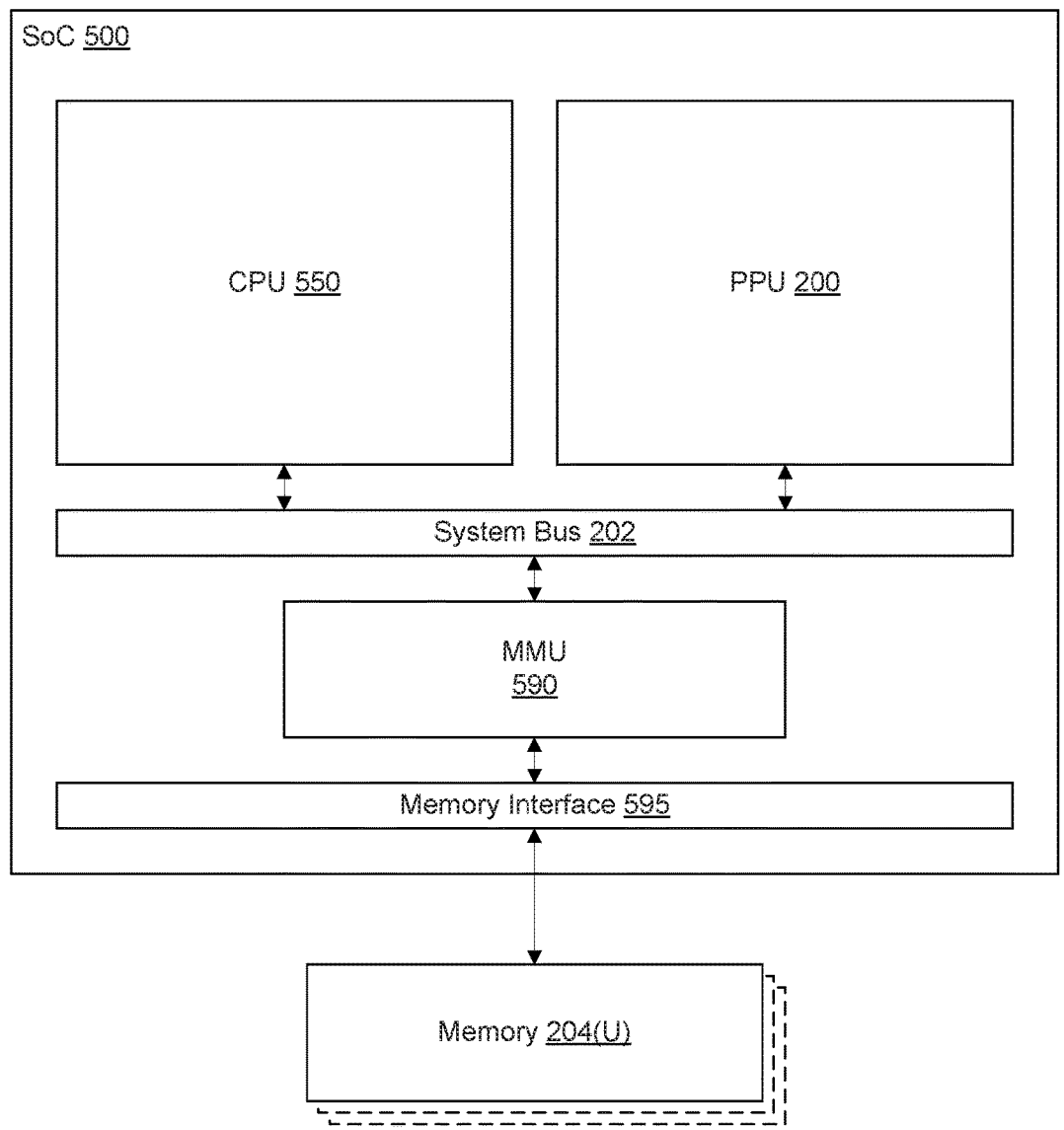
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

No-Update Load Instructions

As set forth above, load instructions may be utilized to decouple data pre-fetch from a demand load. In other words, a first load instruction may be used to pre-fetch the data from the external memory into a cache unit and then a second load instruction may be used to load the data from the cache unit into a register to be accessed by a thread. Decoupling the pre-fetch from the demand loads enables some of the latency associated with the memory accesses to be hidden while other threads are executed. The first instruction may be separated from the second instruction by a synchronization mechanism such as a barrier instruction.

Figure 6:
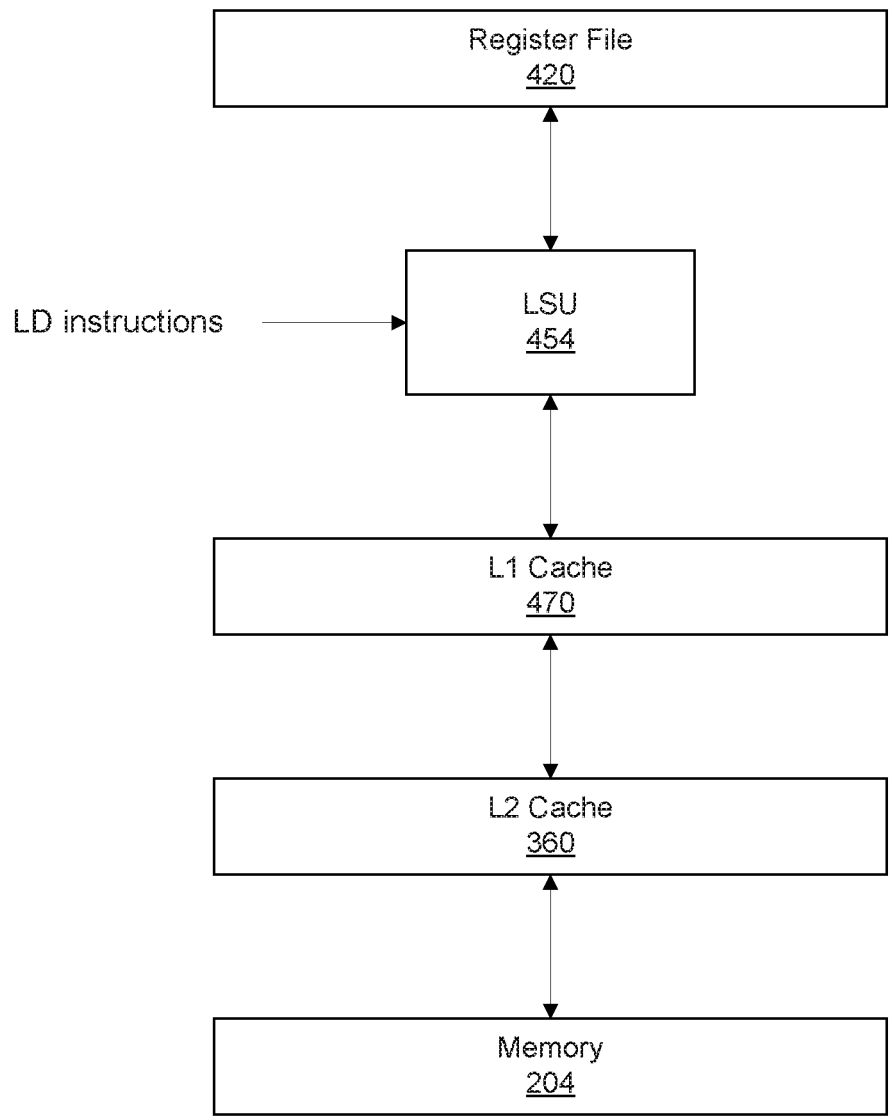
FIG. 6 illustrates the operation of the hierarchical cache memory architecture, in accordance with one embodiment.

FIG. 6 illustrates the operation of the hierarchical cache memory architecture, in accordance with one embodiment. The PPU 200 is configured to execute a number of threads in parallel on a plurality of GPCs 250. Each thread comprises a number of instructions that are executed by one of the SMs 340 of the GPC 250. The instructions for the thread may be loaded into the instruction cache 405 and executed by the corresponding functional units of the SM 340. Load instructions may be executed by the LSU 454. The scheduler unit 410 decodes the load instruction and dispatches the load instruction to the LSU 454. The LSU 454 executes the load instruction and transmits a memory access request to the L1 cache 470. The L1 cache 470 determines whether the data specified by the memory access request is resident in the L1 cache 470. If there is a cache hit, then the data is returned to the LSU 454 and loaded into the register specified by the load instruction. However, if there is a cache miss, then the L1 cache 470 transmits a memory access request to the L2 cache 360. The L2 cache 360 determines whether the data specified by the memory access request is resident in the L2 cache 360. If there is a cache hit, then the data is returned to the L1 cache 470 and stored in the L1 cache. The L1 cache may then transmit the data to the LSU 454. However, if there is a cache miss, then the L2 cache 360 transmits a memory access request to the memory 204 (e.g., an external SDRAM). The data specified by the memory access request is then transmitted to the L2 cache 360 by the memory 204. The data may be stored in the L2 cache 360 and transmitted to the L1 cache 470, where the data is also stored and transmitted to the LSU 454 to be written to the appropriate register as specified by the load instruction. It will be appreciated that, in other embodiments, there may be additional levels of the cache hierarchy between the L2 cache 360 and the memory 204. Furthermore, in yet other embodiments, there may only be a single cache unit between the LSU 454 and the memory 204.

Each load instruction may include an opcode. The scheduler unit 410 may decode the opcode and identify the load instruction as corresponding to the LSU 454. Thus, the load instruction will be dispatched to the LSU 454 for execution. The load instruction also includes a number of operands. The operands may include a destination register and an address. The destination register specifies a particular register where the data is to be stored. The destination register may specify a register in the register file 420 of the SM 340. In the case of a pre-fetch operation, the destination register may be set to a special null register to indicate that the data should be loaded into the cache units but not loaded into the register file 420. The address may be a register containing a byte address, a register containing a byte address plus an offset, or an immediate absolute byte address (e.g., a 32-bit byte address). The load instruction causes the data stored in the byte address specified by the address operand to be loaded into the register specified by the destination register operand.

Each load instruction may also include optional cache operators. Cache operators may be implemented as a bit field in the instruction that follows the opcode. Exemplary cache operators include a cache-all-levels operator {.ca}, a cache-global-level operator {.cg}, a cache-streaming operator {.cs}, a last-use operator {.lu}, and a cache-volatile operator {cv}. The cache-all-levels operator {.ca} allocates cache lines at all hierarchical levels of the cache (e.g., L1, L2, etc.) for storing the data fetched at the address. The cache-global-level operator {.cg} only loads the data into the L2 cache 360, not the L1 cache 470. The cache-streaming operator {.cs} allocates cache lines in the L1 cache 470 and the L2 cache 360 with an evict-first policy, which is useful when the data is only likely to be accessed once or twice (i.e., the data will likely be evicted soon after the load). The last-use operator {.lu} invalidates the cache line in the L1 cache 470 after the load. The cache-volatile operator {cv} invalidates the cache line in the L2 cache 360 such that any subsequent load of the data will require the data to be fetched from memory 204. It will be appreciated that these operators cause the cache state information for the corresponding cache lines to be updated as part of the load operation.

In order to decouple data pre-fetch and the demand load, a new type of cache operator may be implemented. In one embodiment, a no-update operator {.nu} may be implemented that prevents the cache state information from being updated as part of a load operation. During a normal load operation, the cache state information for the cache line corresponding to the byte address of the load instruction will be updated to reflect that the cache line is the most-recently-used (MRU) cache line in the set of cache lines in that cache unit. Thus, when the eviction policy of the cache unit is configured to evict the least-recently-used (LRU) cache line, this cache line will be the last cache line to get evicted of the current cache lines. In contrast, the no-update operator {.nu} prevents the cache state information from changing in response to the load operation. Thus, the cache line corresponding to the byte address of the load instruction will have the same cache state information after the load operation as before the load operation. In other words, the no-update operator {.nu} does not alter the priority order of the set of cache lines for the eviction policy of the cache unit.

In order to decouple data pre-fetch from the demand load, two load instructions may be issued. In one embodiment, the load instructions may be included in the same thread of execution. A first load instruction performs the pre-fetch operation and a subsequent, second load instruction performs the demand load operation. The first load instruction fetches data into the L1 cache 470 and L2 cache 360, but does not load the data into the register file 420. This may be accomplished by executing a regular load instruction with the destination register operand that specifies a special null register, RZ. Including register RZ as the destination register instructs the LSU 454 that the data at the byte address will not be stored in the register file 420. As the LSU 454 completes the load operation, a cache line including the data will be stored in the L1 cache 470 and the L2 cache 360, and the cache state information will be updated to reflect that these cache lines are the most-recently-used (MRU) cache lines in the set of caches lines stored in each cache.

Separate cache state information may be stored for each cache unit in the cache hierarchy. In other words, the same cache line fetched into the L1 cache 470 and the L2 cache 360 may be evicted based on different cache state information. In one embodiment, each cache unit may include a memory that stores cache state information for the cache lines in that cache. The memory may include entries for each set of cache lines stored in the cache. Each entry may include a number of bits that specify the priority rank associated with the cache lines in a particular set of cache lines in order for the cache unit to implement an eviction policy.

The first load instruction may be separated from the second load instruction by a synchronization mechanism that causes the thread to stall until the data has been fetched into the cache units. In one embodiment, the synchronization mechanism is a barrier instruction, such as a scoreboard instruction. The scoreboard instruction causes a thread to stall until all prior memory access requests (e.g., load instructions) have been completed. It will be appreciated that a plurality of load instructions may be issued prior to the scoreboard instruction in order to pre-fetch data from more than one address. The scoreboard instruction will stall the thread until each of the prior issued memory access requests have been completed. Once all the memory access requests have been completed, the thread will be allowed to continue to the next instruction in the thread.

A second load instruction is included in the thread after the synchronization mechanism to perform the demand load operation. The data that was pre-fetched into the L1 cache 470 by the first load instruction should be resident in the L1 cache 470 such that the second load instruction results in a cache hit. The second load instruction includes the no-update operator {.nu} such that the demand load operation does not update the cache state information for the cache line associated with the demand load operation. The demand load operation will read the data from the L1 cache 470 and write the data into the register file 420 at the register specified by the destination register operand of the second load instruction.

In one embodiment, the L1 cache 470 is a 4-way, set associative cache. In other words, the L1 cache 470 is divided into a number of sets, each set including four cache lines. Each cache line may be 1024 bits wide, meaning each set, when fully utilized, contains 4 cache lines of data or 512 bytes of data. It will be appreciated that the number of cache lines in a set and the number of bits in a cache line may vary in different embodiments. The cache state information may comprise a number of bits that store a priority rank for each cache line included in a set. In one embodiment, the cache state information may include two bits for each cache line that represents the priority order of the cache lines in the set. With two bits, the cache state information can take values between 0 and 3. As a normal load operation is performed, the value for each cache line may be changed in order to change the priority order of the cache lines in the set. For example, the active cache line associated with the load operation may be updated to a value of 0, which represents the most recently used cache line. Other cache lines in the set may have a value of 1 added to the value in their cache state information, taking care to only update all other cache lines with priority value less than the previous priority value of the active cache line. Thus, eviction policy may be implemented to evict the cache line with the highest priority order stored in the cache state information (i.e., LRU). In contrast, when a load operation is performed using a load instruction with the no-update operator {.nu}, then the cache state information remains the same before the load operation as after the load operation. Other eviction policies or algorithms for updating the cache state information may be implemented. For example, the cache state information may include 3 or more bits that can take values between 0 and 7. A newly allocated cache line (i.e., a cache line that is allocated as a result of a cache miss in response to a memory access request) may be initiated with a priority value of 2, whereas resident cache lines (i.e., a cache line that is already resident in the cache unit and results in a cache hit in response to a memory access request) may be updated to a priority value of 0. Such operations may prevent cache lines only accessed once from evicting cache lines being frequently requested.

It can be challenging to create an efficient and robust decoupled data fetch mechanism that handles multiple asynchronous threads processing overlapping regions of data. The no-update operator {.nu} is an elegant way to achieve something close to an ideal replacement order for an eviction policy of a cache unit. It will be appreciated that pre-fetch memory access is an indication that the cache line is going to be accessed again later by a demand load from that thread whereas the demand load is not an indication that the cache line will be accessed again. Therefore, eviction policy should follow an LRU replacement order for all pre-fetch memory accesses rather than both pre-fetch and demand load memory accesses. Because multiple asynchronous threads may process overlapping regions of data, multiple pre-fetch memory accesses from different threads may access the same cache lines. Thus, the pre-fetch access order should dictate cache line eviction, which should not be reset on the demand loads.

In another embodiment, the load instructions to perform pre-fetch operations may be executed by one thread and the load instructions to perform the demand load operations may be executed by a different thread. The thread associated with the load instructions that perform pre-fetch operations may include a synchronization mechanism that stalls the thread until the pre-fetch load operations have completed. A separate thread associated with the load instructions that perform demand load operations may not be launched until the first thread has completed. Alternatively, the thread associated with the load instructions that perform demand load operations may include a synchronization mechanism that stalls the thread until the pre-fetch load operations in the other thread have been completed.

Figure 7:
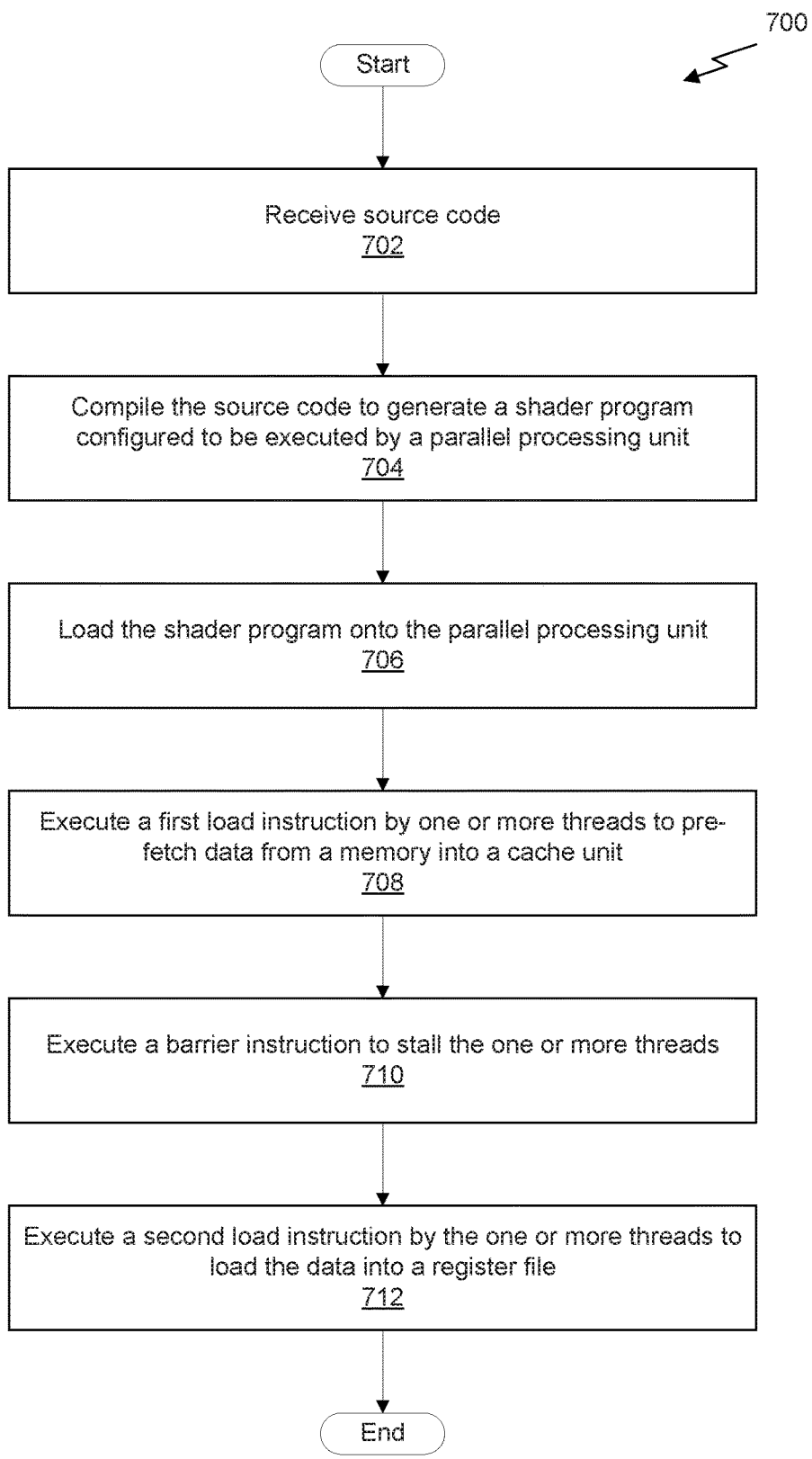
FIG. 7 illustrates a flowchart of a method for issuing load instructions that include control for cache replacement operations, in accordance with another embodiment.

FIG. 7 illustrates a flowchart of a method 700 for issuing load instructions that include control for cache replacement operations, in accordance with another embodiment. At step 702, a driver, being executed by a host processor, receives source code for a shader. In one embodiment, the source code comprises a shader written in a high level shader language such as GLSL, Cg, or HLSL. At step 704, the driver compiles the source code to generate a shader program. The shader program is a binary file including a plurality of instructions configured to be executed by a parallel processing unit. The instructions may include a first load instruction, a barrier instruction, and a second load instruction. At step 706, the driver loads the shader program onto the parallel processing unit. In one embodiment, the parallel processing unit is configured to launch one or more thread blocks configured to process data in parallel according the instructions of the shader program. Each thread in the thread block processes different data in parallel. For example, a fragment shader processes fragments for different pixels in an image, each thread processing different fragments. At step 708, the first load instruction is executed by one or more threads, which fetches data from the memory 204 into the L1 cache 470. The first load instruction specifies the destination register as a null register such that the data is not loaded into the register file 420. At step 710, the barrier instruction is executed which causes the one or more threads to stall until the memory access requests associated with the first load instruction have completed. At step 712, the second load instruction is executed by one or more threads, which loads the data from the L1 cache 470 into the register file 420. The second load instruction includes a no-update {.nu} operator such that the cache state information for the cache line that includes the data is not updated in response to performing the second load operation.

It will be appreciated that the parallel processing unit, such as PPU 200, may be a co-processor to a host processor, such as a CPU, where the parallel processing unit is optimized for performing highly parallel calculations such as those for generating graphics. The host processor executes an operating system and applications that generate graphics for display on a display device. The driver may be included in the operating system and is a program that enables the applications to communicate with the parallel processing unit. In one embodiment, the driver implements an API (application programming interface) that enables instructions in the applications executed by the host processor to utilize the parallel processing unit. The driver may also include a compiler that is configured to convert source code for shader programs into binary files that include a plurality of instructions. Threads of execution may be configured to execute the instructions in the shader program to process data on the parallel processing unit.

Figure 8:
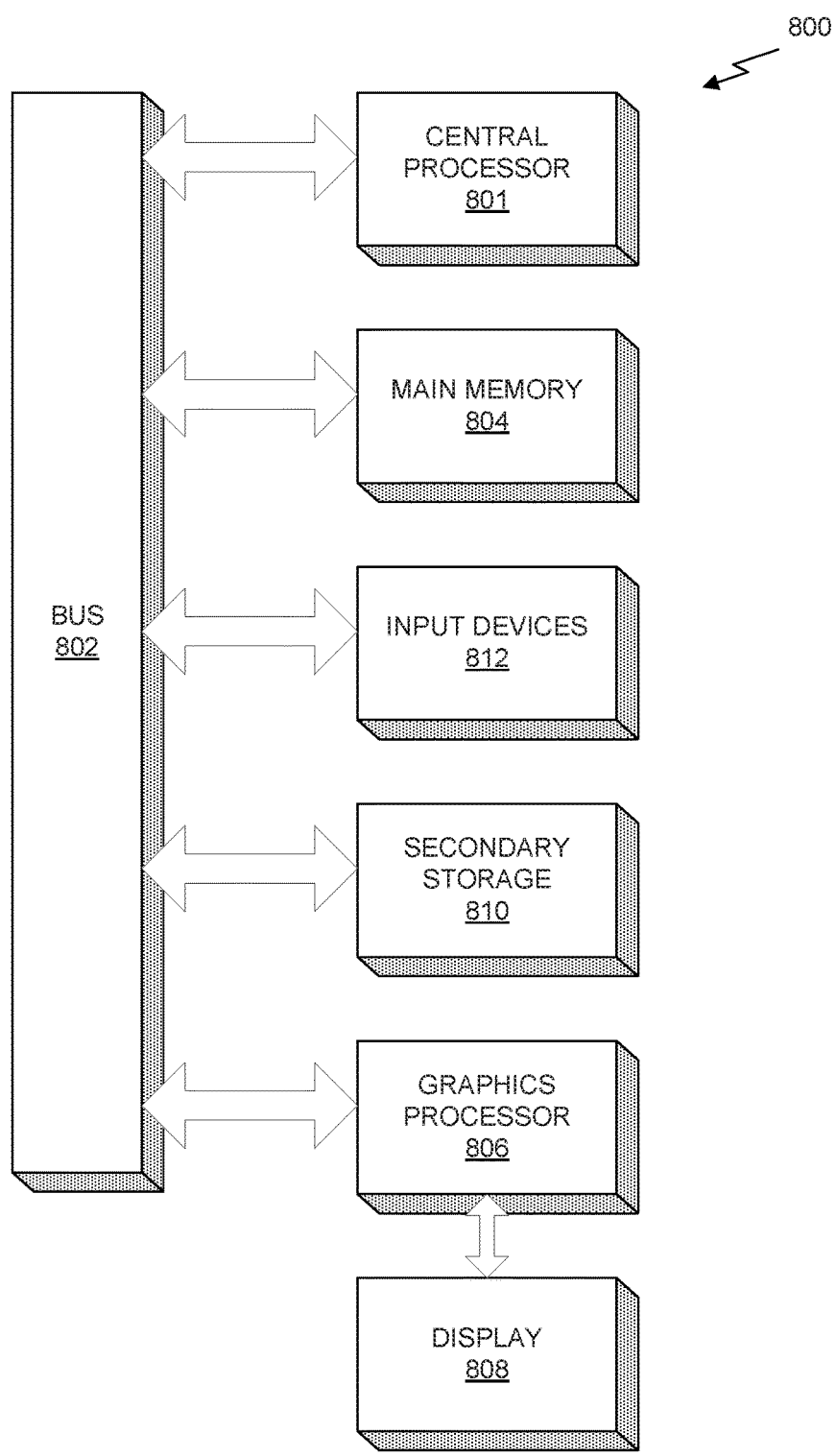
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a set of instructions to be executed by a processor that includes a cache unit, wherein at least one instruction in the set of instructions includes a first load instruction and a second load instruction;
executing the first load instruction configured to prefetch data from a memory into the cache unit and updating cache state information corresponding to an eviction policy for a first cache line in the cache unit that stores at least a portion of the data; and
after executing the first load instruction, executing the second load instruction configured to load the at least a portion of the data from the first cache line into a register, wherein the second load instruction includes a no-update operator that prevents the cache unit from updating the cache state information corresponding to the eviction policy for the first cache line that is specified by the second load instruction.

2. The method of claim 1, wherein a thread is configured to execute the set of instructions.

3. The method of claim 2, the method further comprising stalling the thread based on a synchronization mechanism after executing the first load instruction and prior to executing the second load instruction, wherein the synchronization mechanism comprises a barrier instruction.

4. The method of claim 3, wherein the barrier instruction is a scoreboard instruction that causes a thread to stall until all prior issued memory access requests have completed.

5. The method of claim 1, wherein the second load instruction comprises an opcode, an address operand, a destination register operand, and an optional cache operator.

6. The method of claim 5, wherein the address operand comprises one of a register containing a byte address, a register containing a byte address plus an offset, and an immediate absolute byte address.

7. The method of claim 1, wherein a first thread executes the first load instruction and a second thread executes the second load instruction.

8. The method of claim 1, further comprising:
receiving source code for a shader;
compiling the source code to generate a shader program configured to be executed by a parallel processing unit, wherein the shader program comprises the set of instructions; and
loading the shader program on the parallel processing unit, wherein the parallel processing unit is configured to launch one or more thread blocks configured to process data in parallel according to the instructions of the shader program.

9. The method of claim 8, wherein each thread block in the one or more thread blocks includes a number of threads, each thread executing the instructions of the shader program in parallel.

10. A method, comprising:
receiving a set of instructions to be executed by a processor that includes a cache unit, wherein at least one instruction in the set of instructions includes a load instruction comprising an optional cache operator and the optional cache operator comprises a bit field that may specify a cache operator selected from a cache-all-levels operator {.ca}, a cache-global-level operator {.cg}, a cache-streaming operator {.cs}, a last-use operator {lu}, a cache-volatile operator {.cv}, and the no-update operator {.nu}; and
executing the load instruction configured to perform a load operation, wherein the load instruction includes a no-update operator that prevents the cache unit from updating cache state information corresponding to an eviction policy for a cache line specified by the load instruction in response to the load operation.

11. A non-transitory, computer-readable storage medium storing instructions that, when executed by a processor, cause the processor to perform steps comprising:
receiving a set of instructions to be executed by a processor that includes a cache unit, wherein at least one instruction in the set of instructions includes a first load instruction and a second load instruction;
executing the first load instruction configured to prefetch data from a memory into the cache unit and updating cache state information corresponding to an eviction policy for a first cache line in the cache unit that stores at least a portion of the data; and
after executing the first load instruction, executing the second load instruction configured to load at least a portion of the data from the first cache line into a register, wherein the second load instruction includes a no-update operator that prevents the cache unit from updating the cache state information corresponding to the eviction policy for the first cache line that is specified by the second load instruction.

12. The computer-readable storage medium of claim 11, wherein a thread is configured to execute the set of instructions.

13. The computer-readable storage medium of claim 12, the steps further comprising stalling the thread based on a synchronization mechanism after executing the first load instruction and prior to executing the second load instruction, wherein the synchronization mechanism comprises a barrier instruction.

14. The computer-readable storage medium of claim 11, wherein the second load instruction comprises an opcode, an address operand, a destination register operand, and an optional cache operator.

15. The computer-readable storage medium of claim 11, the steps further comprising:
receiving source code for a shader;
compiling the source code to generate a shader program configured to be executed by a parallel processing unit, wherein the shader program comprises the set of instructions; and
loading the shader program on the parallel processing unit, wherein the parallel processing unit is configured to launch one or more thread blocks configured to process data in parallel according to the instructions of the shader program.

16. A computer-readable storage medium, comprising:
receiving a set of instructions to be executed by a processor that includes a cache unit, wherein at least one instruction in the set of instructions includes a load instruction comprising an optional cache operator and the optional cache operator comprises a bit field that may specify a cache operator selected from a cache-all-levels operator {.ca}, a cache-global-level operator {.cg}, a cache-streaming operator {.cs}, a last-use operator {.lu}, a cache-volatile operator {.cv}, and the no-update operator {.nu}; and
executing the load instruction configured to perform a load operation, wherein the load instruction includes a no-update operator that prevents the cache unit from updating cache state information corresponding to an eviction policy for a cache line specified by the load instruction in response to the load operation.

17. A system, comprising:
a processor configured to:
receive a set of instructions to be executed by a processor that includes a cache unit, wherein at least one instruction in the set of instructions includes a first load instruction and a second load instruction;
execute the first load instruction configured to prefetch data from a memory into the cache unit and updating cache state information corresponding to an eviction policy for a first cache line in the cache unit that stores at least a portion of the data; and
after executing the first load instruction, execute the second load instruction configured to load at least a portion of the data from in the first cache line into a register, wherein the second load instruction includes a no-update operator that prevents the cache unit from updating the cache state information corresponding to the eviction policy for the first cache line that is specified by the second load instruction.

18. The system of claim 17, wherein a thread is configured to execute the set of instructions.

19. The system of claim 17, wherein the processor is a parallel processing unit, the system further comprising a host processor that executes an operating system, a driver, and one or more applications, the host processor in communication with the parallel processing unit.

20. The system of claim 19, wherein the driver is configured to:
receive source code for a shader;
compile the source code to generate a shader program configured to be executed by a parallel processing unit, wherein the shader program comprises the set of instructions; and
load the shader program on the parallel processing unit, wherein the parallel processing unit is configured to launch one or more thread blocks configured to process data in parallel according to the instructions of the shader program.

* * * * *